United States Patent [19]
Yang et al.

[11] Patent Number: 5,652,541
[45] Date of Patent: Jul. 29, 1997

[54] DATA DEMODULATOR EMPLOYING DECISION FEEDBACK FOR REFERENCE PARAMETER RECOVERY AND METHOD USED THERIN

[75] Inventors: Gordon G. Yang, Richmond; William Chong, Surrey; David W. Russo, Burnaby, all of Canada

[73] Assignee: Motorola, Inc., Schaumburg, Ill.

[21] Appl. No.: 618,338

[22] Filed: Mar. 19, 1996

Related U.S. Application Data

[63] Continuation of Ser. No. 156,600, Nov. 23, 1993, abandoned.

[51] Int. Cl.⁶ ............................................. H04B 15/00
[52] U.S. Cl. .......................... 329/300; 375/336; 375/346; 375/340; 375/233; 375/290
[58] Field of Search .......................... 329/300, 318, 329/319; 375/365, 368, 316, 340, 274, 233, 290, 336, 346, 317, 319; 331/34

[56] References Cited

U.S. PATENT DOCUMENTS

| | | | |
|---|---|---|---|
| 4,564,952 | 1/1986 | Karabinis et al. | 375/14 |
| 4,631,735 | 12/1986 | Qureshi | 375/34 |
| 4,977,580 | 12/1990 | McNicol | 375/97 |
| 5,249,200 | 9/1993 | Chen et al. | 375/58 |
| 5,263,033 | 11/1993 | Seshadri | 371/43 |
| 5,268,930 | 12/1993 | Sendyk et al. | 375/13 |
| 5,282,225 | 1/1994 | Nikias et al. | 375/14 |

FOREIGN PATENT DOCUMENTS 0517533  12/1992  European Pat. Off. .............. 329/300

OTHER PUBLICATIONS

*Multilevel Decision Method for Band–Limited Digital FM with Limiter–Discriminator Detection*, by Masahiko Hirono, Toshio Miki and Kazuaki Murota, IEEE Transactions on Vehicular Technology, vol. VT–33, No. 3, Aug. 1984, pp. 114–121.

*Analysis of GMSK with Discriminator Detection in Mobile Radio Channels*, by Said M. Einoubi, IEEE Transactions on Vehicular Techgnology, vol. VT–35, No. 2, May 1986, pp. 71–75.

*GMSK Transmission Performance in Land Mobile Radio*, by Kenkichi Hirade, Kazuaki Murota, and Masaharu Hata, Yokosuka Electrical Communication Laboroatory, Nippon Telegraph and Telephone Public Corporation, IEEE, pp. 328–333.

*Primary Examiner*—Robert Pascal
*Assistant Examiner*—Arnold Kinkead
*Attorney, Agent, or Firm*—Kevin A. Buford

[57] ABSTRACT

A data demodulator operating to recover symbols from a data signal including, an estimator, coupled to the data signal, for estimating a reference parameter, and a decision function that is responsive to the reference parameter and the data signal, for selecting a symbol for a symbol time from a set of predetermined symbols where the symbol is coupled to the estimator for updating the reference parameter when the symbol is representative of the reference parameter.

22 Claims, 4 Drawing Sheets

DATA DEMODULATOR EMPLOYING DECISION FEEDBACK FOR REFERENCE PARAMETER RECOVERY AND METHOD USED THERIN

This is a continuation of application Ser. No. 08/156,600, filed Nov. 23, 1993 and now abandoned.

FIELD OF THE INVENTION

This disclosure deals with data communications systems and more specifically, but not limited to, such systems including data demodulators adapted to recover reference parameters and methods used therein.

BACKGROUND OF THE INVENTION

In data communications systems, the data to be transported or communicated is transported over a channel, that may have unknown, indeterminate, or varying characteristics and the data is therefore subject to various forms of corruption. Such channel parameters include, for example, channel length or time delay, channel gain or more accurately loss, and various additive signals such as noise or DC (non time variant) offsets. Additional forms of corruption may be encountered because of the data communications equipment employed or other conditioning of the data required to facilitate transport of the data over a particular channel.

The latter issues may become particularly pronounced in wireless data communications systems. These systems typically employ some form of modulation of a radio frequency carrier, use channels that may be especially difficult to characterize, and employ equipment with inherent variations that, without more, could materially impact the integrity of the data as received. The net of all this is that practitioners have accepted the notion that a wireless data communications system and more specifically a receiver or demodulator will have to take affirmative steps to accurately demodulate or reproduce the data that was intended to be transported over the wireless channel.

It is now routine for data receivers or demodulators to provide, for example, some form of estimate of the received signal's amplitude, DC offset, and phase or timing. These estimates are in turn used to enhance the demodulator's overall accuracy by removing or minimizing disadvantageous effects resulting from, among others, the above sources of corruption. For example, a DC offset, resulting from a frequency difference between a transmitter and the receiver in a frequency modulation system, may be estimated by finding and tracking over time the average of the peak and the minimum received signal level and subtracting this average from the received signal.

As is well known, if this DC offset is accurately estimated and the received signal is adjusted by removing this estimate the data demodulator can more accurately distinguish between possible data symbols and therefore more accurately recover the data that was transported. Similar scenarios hold for the amplitude and phase or timing estimates. In any event the bit error rate (BER) performance of the data communications system will be improved or will suffer in accordance with the accuracy of these various estimates. Present data demodulators first provide these estimates, then adjust the received signal in accordance with these estimates, and finally select a data symbol for a symbol time in response to this adjusted receive signal. These demodulators operate satisfactorily on some forms of modulation but are systematically deficient for more spectrally efficient modulation approaches or any modulation approach that has a so called partial response.

Partial response is used to designate a characteristic of modulation approaches where the effect on a carrier of a particular symbol for a particular symbol time is dependent on the symbols that occurred in one or more preceding symbol times. For example, consider a RF carrier and a two level gaussian minimum shift keyed (GMSK) modulation approach. Under these circumstances the maximum frequency deviation of the RF carrier and thus maximum received signal amplitude may not be realized or observed until more than one identical symbol has been transmitted and hence received. Therefore estimates of the maximum amplitude made with or as the result of a sole symbol may be erroneous and the data communications system BER performance can suffer. Clearly a need exists for a data receiver and data decoder that employ methods and procedures to account for modulation approaches that have partial responses.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

DETAILED DESCRIPTION OF A PREFERRED EMBODIMENT

Generally the present invention provides apparati and methods for improving the bit error rate (BER) performance of data communications system. This is accomplished with an inventive data receiver that uses a data demodulator employing decision feedback for improved reference parameter recovery and the methods used therein. Generally and as an overview of the detailed explanation below, the data demodulator operates to recover symbols from a data signal that includes a plurality of symbols sequentially disposed in a plurality of corresponding symbol times. The data demodulator includes an estimator for estimating a reference parameter of the data signal and a decision function, apparatus, or circuit that responds, collectively, to the reference parameter and the data signal and selects a symbol for a symbol time from a set of predetermined symbols. This symbol is then coupled, in a feedback arrangement, to the estimator which updates the reference parameter whenever the symbol is representative of the reference parameter.

In a preferred embodiment the estimator includes an amplitude estimator for estimating a reference amplitude, a DC offset estimator for estimating a reference DC offset, and a timing estimator for estimating a reference time. The reference DC offset is utilized by the decision function to eliminate a DC offset parameter from the weighted data signal and the reference amplitude is utilized provide a weighted data signal for the operation of selecting a symbol in accordance with a reference or time clock that has been adjusted with the reference time. Another embodiment includes a data receiver that operates to recover symbols from a radio frequency signal which includes data modulation. The data receiver converts the radio frequency signal including data modulation to a data signal that includes a plurality of symbols sequentially disposed in a plurality of corresponding symbol times and using a data demodulator, as generally described above, recovers symbols.

A method embodiment of the instant invention includes estimating a reference parameter, such as a reference amplitude, a reference DC offset, or a reference time, of the data signal, selecting, responsive to the reference parameter and the data signal, a symbol for a symbol time from a set of predetermined symbols, and updating the reference parameter when the symbol is representative of the reference parameter. The method may further include weighting, responsive to the reference amplitude, the data signal and eliminating, responsive to the reference DC offset, a DC offset parameter from the data signal.

Figure 1:
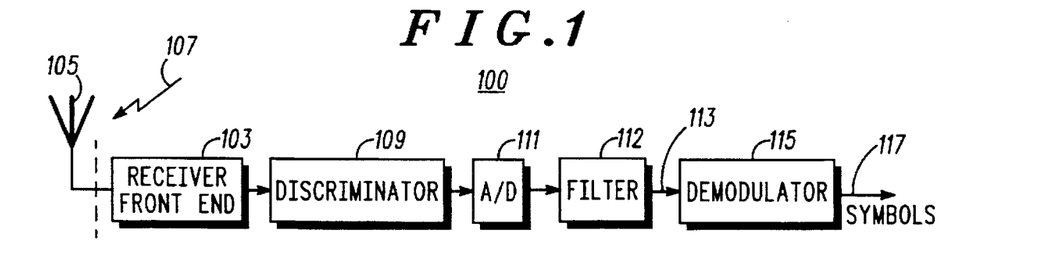
FIG. 1 is a block diagram of a data receiver in accordance with an embodiment of the instant invention.

With that overview the instant invention can be more fully described with reference to the Figures in which FIG. 1 illustrates a data receiver (100) coupled to an antenna (105) in accordance with a preferred embodiment. The data receiver (100) includes a receiver front end (103) that is coupled to a discriminator (109) that is in turn coupled to an analog to digital converter (A/D) (111) which, after filtering by a filter (112), drives, at input (113), a demodulator (115). The data receiver (100) is arranged and constructed to receive and convert a radio frequency (RF) signal (107) that includes data modulation to a data signal that includes a plurality of symbols sequentially disposed in a plurality of corresponding symbol times. This data signal is available in analog form at the output of the discriminator (109) and in filtered digital form at the input (113) of the demodulator (115). The filter (112) is usually required to reduce the spectral noise from the signal which does not contribute to the modulation. This filter can be a simple low pass filter or a more complex matched filter for a more optimal receiver. The demodulator (115) operates to recover symbols from the data signal and provide these symbols at output (117).

The receiver front end (103) includes various radio processing functions such as one or more stages of amplification, filtering, mixing, frequency generation and control functions all generally known in the art. The discriminator (109) operates to convert a change in frequency of the RF signal (107) to an analog voltage. While designated discriminator those skilled in the art will realize that many forms of converting a frequency deviation or change into an analog voltage are known and all will equally well suffice for an embodiment of the present invention. Additionally, the invention is not limited to a discriminator receiver but rather applies as well to coherent or differential receivers.

Figure 2:
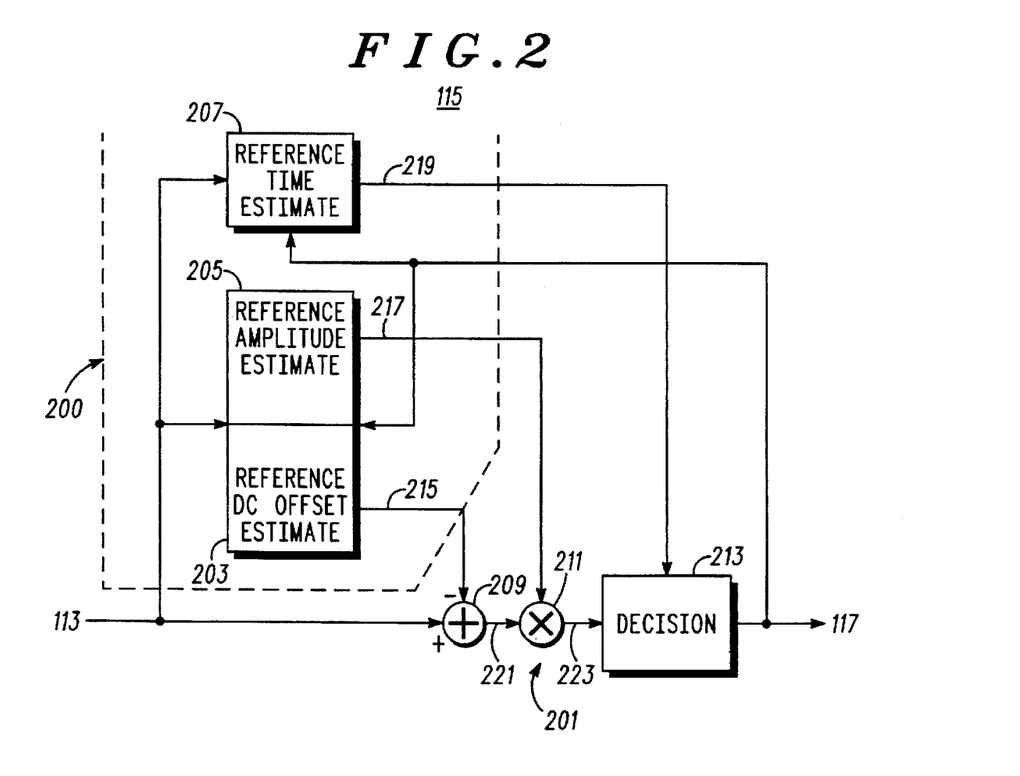
FIG. 2A is a block diagram of a data demodulator in accordance with an embodiment of the instant invention.

Referring to FIG. 2 where like reference numerals refer to like elements, the demodulator (115) is illustrated in greater detail. The data signal at the input (113) is coupled to an estimator (200) and further to a decision function (201). A preferred embodiment of the demodulator (115) uses digital signal processing techniques. However, this is not a requirement to enable the use of the invention described herein. A sampling rate of four digitized samples of the analog signal per data symbol was utilized. The estimator (200) in a preferred embodiment includes a reference DC offset estimator (203), a reference amplitude estimator (205), and a reference time estimator (207), all operating to estimate a reference parameter, specifically and respectively, a reference DC offset at output (215), a reference amplitude at output (217), and a reference time at output (219), for the data signal. The decision function (201) includes a series combination of an adder (209) coupled to a multiplier (211) and further coupled to a decision circuit (213) with the data signal at the input (113) driving the adder (209) and the decision circuit (213) providing symbols at the output (117). The reference DC offset at the output (215) is subtracted or removed from the data signal at the input (113) by the adder (209). This generates a data signal with a "0" DC level or a DC free signal at a adder output (221). The DC free signal at output (221) is then multiplied or scaled by the reference amplitude at the output (217) using the multiplier (211). This produces a DC free and amplitude compensated or amplitude normalized data signal at the decision input (223) of the decision circuit (213).

Eliminating the DC offset permits more accurate estimation of the received symbols and thus improves the accuracy of recovered symbols. If the DC offset is not removed, it has the effect of distorting the reference timing of the symbols and will increase the likelihood of making a decoding error on the symbol in the decision function (201). Correspondingly, errors in the amplitude of the input (113) will cause the decision function (201) to also make errors. For these reasons, it is necessary to eliminate these distortions as much as possible to more accurately decode the input signal (113) and thus enhance the accuracy or BER of the recovered symbols at the output (117).

The decision circuit (213) takes the DC free and amplitude compensated signal at the decision input (223) and the reference time at output (213) and makes a decision or a determination or a selection of a symbol from a set of predetermined symbols for each symbol time corresponding to each symbol time of the data signal at input (113). Since some signals, such as Gaussian Minimum Shift Keyed (GMSK) signals, can be characterized as having a partial response the decision circuit (213) for optimum results should examine previous symbols as well as the present symbol. Signals with a partial response are those where a given symbol in a given symbol time will effect one or more subsequent symbols due, for example, to the limited bandwidth of the channel relative to the unconstrained bandwidth of the signal. A portion of the channel may be arranged, as in GMSK, to intentionally add inter-symbol interference to the signals to constrain their bandwidth in order to be compatible with the limited bandwidth of a second portion of the channel. The decision circuit (213) by taking into consideration past or previous symbols together with the current symbol produces a result and compares that result against a reference threshold. If the result satisfies, preferably is greater, than the threshold, a "1" bit is declared as the data symbol at output (117). If the result does not satisfy, preferably is not greater than, the threshold, a "0" bit is declared as the data symbol.

The data symbols at output (117) which are decisions from the decision circuit (213), are coupled to or feed back to the estimator (200), specifically the reference DC offset estimator (201), the reference amplitude estimator (205), and the reference time estimator (207). The symbol, coupled in this feedback arrangement to the estimator (200), allows or provides additional information to the estimator (200)

which then updates the appropriate and relevant reference parameter when the symbol is representative of that reference parameter. Specifically, by using particular sequences of decisions, received symbol sequences, formed from the current and some one or more previous symbols or decisions, to condition or enable certain operations within the estimators, more accurate estimates of the reference parameters can be made. This improves the symbol or bit error rate (BER) of the demodulator.

Figure 3:
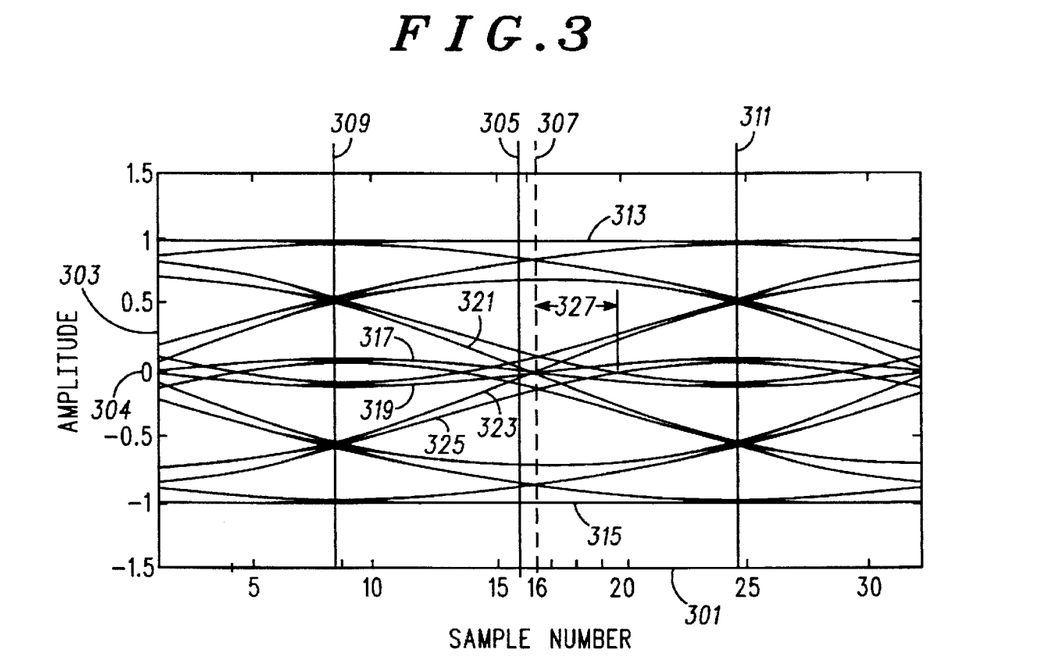
FIG. 3 is an eye diagram of a data signal suitable for illustrating the operation of the FIG. 2 embodiment.

Referring to FIG. 3, an eye pattern for an exemplary data signal is depicted that illustrates, inter alia, a partial response and the attendant issues or concerns that may be advantageously dealt with using an embodiment of the instant invention. The eye pattern, plotted from data captured at 16 samples per symbol for improved plotting resolution, specifically shows a GMSK signal with a bandwidth-time (BT) product of 0.3. With this modulation technique, one bit is coded into one data symbol. A normalized amplitude is shown on the vertical axis (303) and the sample number is depicted on the horizontal axis (301). Two symbol times are depicted in FIG. 3. The center of the first symbol (309) is located between samples 7 and 8. The center of the second symbol (311) is located between samples 24 and 25. The transition between the two symbols is indicated at (307). Signals which represent a one bit are above the "0" point (304) of axis (303). Signals representing a zero bit are below the "0" point (304). At the center of the first symbol and the second symbol (309 & 311), various amplitude levels occur. These different amplitude levels are indicative of the particular symbol sequence which causes their formation and is characteristic of a signal occurring within a partial response system. Because of these multilevel characteristics, significant pattern noise or systematic error is found in estimating the reference amplitude and the reference DC offset. This pattern noise degrades the BER performance of the demodulator. Zero crossings can be used to generate a reference time estimate (305). However, there is also significant pattern noise there. As can be seen from FIG. 3, the reference time estimate (305) is not located at the true transition point (307). This also will degrade the BER performance of the demodulator.

Careful examination of the GMSK signal reveals the signal levels associated with the symbol patterns 0000 (315) and 1111 (313), have minimal pattern noise and thus reasonably accurate or true amplitude and DC reference values. These symbol patterns may then be used as explained further below to generate the reference amplitude and the reference DC offset. The zero crossing associated with symbol patterns 1100 (321), 0011 (323), 1010 (319), and 0101 (317) contain exact timing information, in that, they cross the zero axis (303) at the symbol transition point (307). When only these symbol patterns are selected to enable or activate or update, respectively, the reference DC offset estimator (203), the reference amplitude estimator (205), and the reference time estimator (207) the effect or impact of pattern noise will be reduced resulting in improved BER performance of the demodulator (115). To select the appropriate symbol patterns, the decisions or symbols from the decision function, specifically the decision circuit (213), at output (117), are fed back to the reference DC offset estimator (203), the reference amplitude estimator (205) and the reference time estimator (207).

One possible disadvantage of this technique is the estimator only updates once every four symbol times on average. However, it is possible to account for this issue by addition of an extra correction factor(s). For example, the symbol pattern 010 (325), among others, does not produce a zero crossing at the transition point (307). Nevertheless, the actual zero crossing does occurs at a known, predictable, and fixed interval (327) from the transition point (307). The addition of an extra timing offset to the reference time estimator (207) (not specifically shown but readily implemented by one of ordinary skill in the art) can be implemented in the FIG. 2 embodiment, admittedly at the expense of additional complexity, and thus account for and factor into the reference time estimate this fixed interval (327). Similarly, by observation of FIG. 3, other fixed and known relationships corresponding to certain symbol patterns exist that may be taken advantage of for the reference DC offset estimator as well as the reference amplitude estimator. In any event these additional patterns may be utilized to provide more frequent updates or additional information regarding any of the relevant reference parameters.

Figure 4:
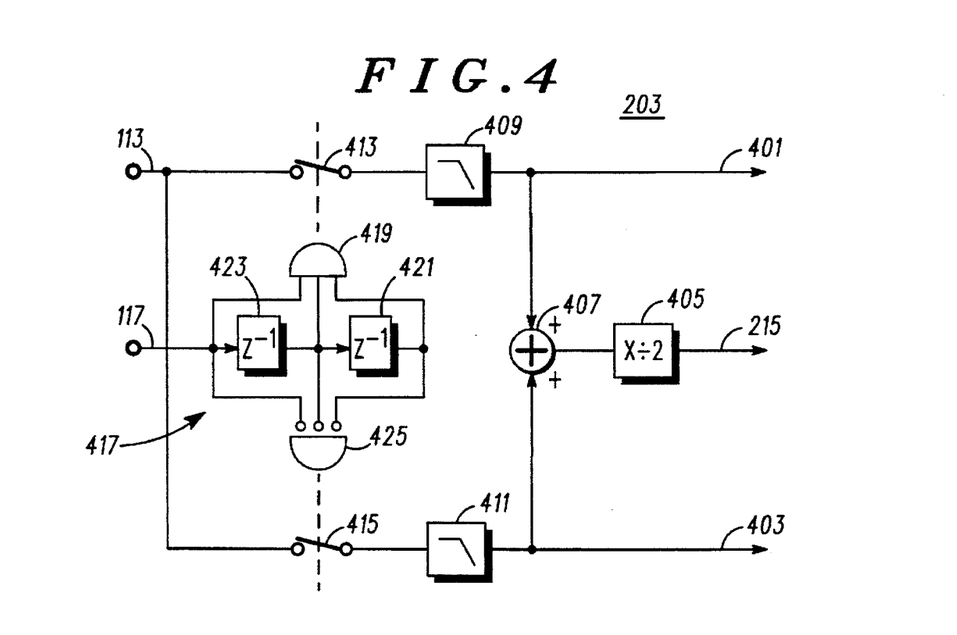
FIG. 4 is an embodiment of an estimator suitable for use in the FIG. 2 embodiment.

Referring to FIG. 4, the DC offset estimator (203) is coupled to the signal at the input (113), provides the reference DC offset at the output (215), and includes a DC pattern detector function (417), a positive peak detector and filter (409), a negative peak detector and filter (411), and an averaging circuit (405, 407), all operating to estimate the reference DC offset. The data symbols from output (117) are delayed and stored by two elements (421 and 423). The last three fed back data symbols are tested for a 111 bit pattern by a comparator (419) and for a 000 bit pattern by a comparator (425). When either the 111 or the 000 symbol sequence is detected, the data signal at the input (113) is coupled, respectively, by a switch (413) to the positive peak detector and filter (409) and by a switch (415) to the negative peak detector and filter (411).

The data input signal (113), is then scanned by the respective peak detector to locate the largest positive peak or negative peak for the current data symbol. This peak value is then filtered to generate an average positive peak (401) or an average negative peak (403). The filters (P/O 409, 411) used to perform the averaging are a single stage infinite impulse response (IIR) low pass filter. The transfer function of each filter is given by:

$$H(z)=0.1/(1-0.9\ z^{-1})$$

The average positive peak (401) is added to the average negative peak (403) by the summing element (407). This value is then divided by two by a multiplier (405) to form the reference DC offset (215). Since the average negative peak is less than zero and the average positive peak is greater than zero, when both the average positive peak and the average negative peak have the same magnitude, the reference DC offset will be zero.

Figure 5:
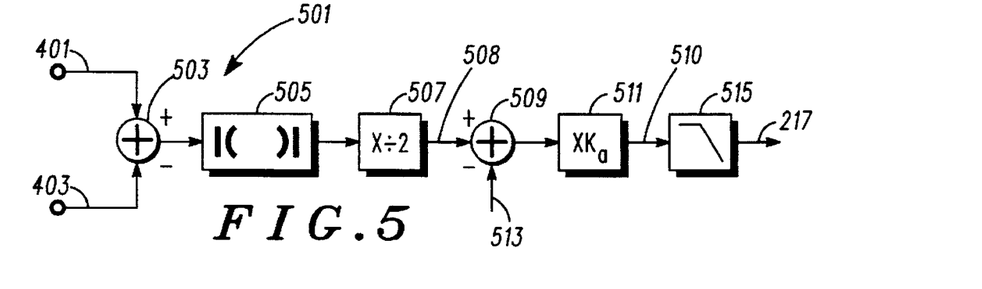
FIG. 5 is an alternative embodiment of an estimator suitable for use in the FIG. 2 embodiment.

Referring to FIG. 5, the reference amplitude estimator (205) includes in part, a magnitude circuit (501), a reference comparator circuit (509) driven by an ideal reference signal (513), and a filter circuit (511 and 515), interconnected as depicted and operating to estimate the reference amplitude at output (217). The balance of the reference amplitude estimator (205) is that portion of FIG. 4 devoted to producing the average positive and negative peaks (401 & 403). The average positive peak (401) and the average negative peak (403) are subtracted at an adder (503) from each other and the absolute value is taken by a function (505). This absolute value is then divided by two at a multiplier (507) to provide a magnitude of the current or present data symbol at an input (508) of the reference comparator circuit (509). The ideal reference signal (513) is then subtracted from the magnitude of the current data symbol by the reference comparator circuit (509) to form an amplitude error at input (510) of multiplier (511). The ideal reference signal (513) represents the internal ideal amplitude the input signal (113) should be. The actual value used for the ideal reference signal depends upon the internal scaling used by a Digital Signal Processor (DSP) to prevent overflow of the arithmetic calculations. Within the preferred embodiment, the ideal reference was set to 0.13435.

The amplitude error (510) is scaled by the multiplier (511) and the results drives a filter (515) to generate the reference amplitude at the output (217). The scaling and filtering are represented by the transfer function:

$$H(z)=Ka/(1-z^{-1})$$

The value of Ka used is 0.02. This produces a low pass filter with a very small corner frequency. The filter was designed to have a very slow response since the input signal amplitude should be changing slowly once proper demodulation has been established relative to the data rate. It is possible to dynamically change the bandwidth of both the filters used in the reference DC offset estimator and the reference amplitude estimators to aid in the quick initial recovery of these estimates. First, by using filters which have a much higher corner frequency, the estimators establish a quick reference. Afterwards, the filters are switched to the much smaller or lower corner frequencies to provide good stable reference values.

Figure 6:
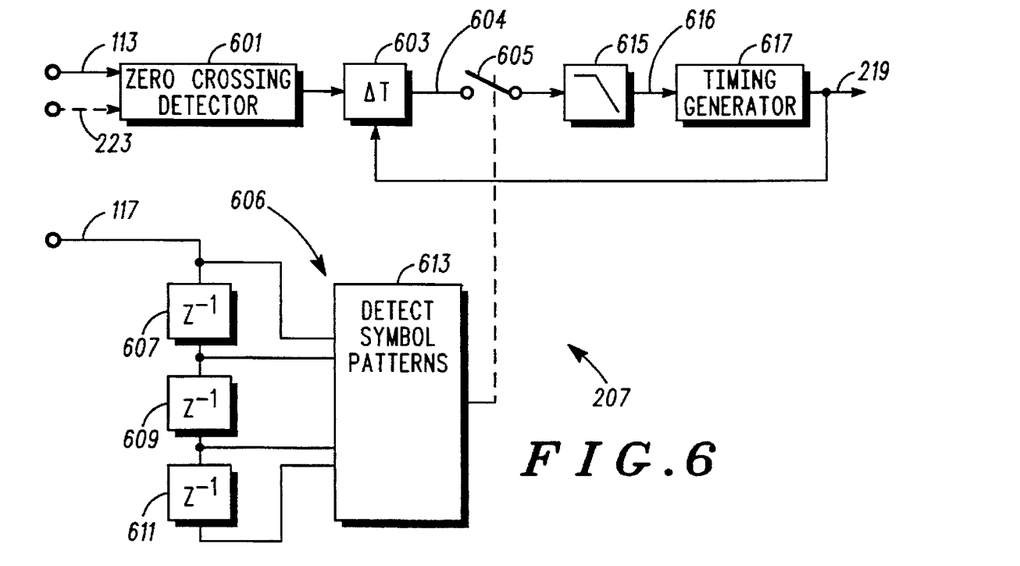
FIG. 6 is a further alternative embodiment of an estimator suitable for use in the FIG. 2 embodiment.

Referring to FIG. 6, the Reference time estimator (207) includes a zero crossing detector (601), a timing reference error detector (603), a switch (605), a low pass filter (615), a timing generator (617), and a decision feedback detector (606) all interconnected as depicted and operating on the signal at the input (113) to provide a reference time at the output (219).

The input signal (113) is first DC compensated and amplitude adjusted to remove these distortions. The resulting signal is then scanned for a zero crossing all by the zero crossing detector (601). In practice in the interest of implementation simplicity, the DC free and amplitude compensated signal at the input (223) may be scanned for a zero crossing rather than duplicating the processing and calculations performed on the signal at the input (113) as previously described with reference to FIG. 4 and 5. The zero crossing measurement can be accomplished in many ways. The approach used in the preferred embodiment was to detect the point where the data samples changed from either positive to negative or negative to positive. Linear interpolation between samples can provide addition resolution on the location of the measured zero crossing time. The measured zero crossing time is then compared to the reference time (last provided) at the output (219) by the timing reference error detector (603) and a time error is generated at a output (604).

The decision feedback detector (606) includes storage elements (607, 609, and 611) coupled to a pattern detector (613). The three fed back data symbols (117) are stored and delayed by the storage elements (607, 609, and 611). The four last data symbols received by the demodulator are then compared against the bit patterns 1100, 0011, 1010, and 0101 by the pattern detector (613). When any of these patterns are detected, the switch (605) is activated and the time error at output (604) is coupled to the low pass filter (615). The low pass filter (615) averages the time error and provides an averaged time error at output (616) to drive or feed the timing generator (617). The low pass filter (615) used for the reference time estimator can be realized as a first order IIR filter represented by the transfer function;

$$H(z)=0.01/(1-0.95z^{-1}).$$

The timing generator (617) operates to adjust the reference time "back" by an increment when the average time error is greater than zero and "forward" by an increment when the average time error is less than zero. The increment used to adjust the timing generator is dependent upon the exact requirements of the demodulator. The preferred embodiment used a value equal to 1/16 of a symbol time. A dead-band can also be included such that if the average time error is less than the dead-band threshold, no timing adjustment is made. In any event the reference time is updated and supplied to output (219) and hence to the decision circuit (213) and back to the timing reference error detector (603).

Figure 7:
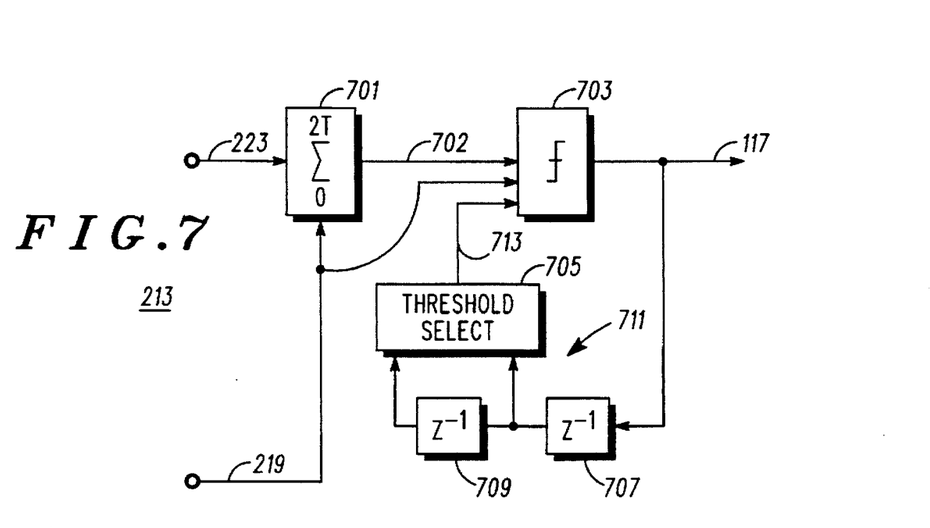
FIG. 7 is an exemplary embodiment of a portion of a decision function suitable for use in the FIG. 2 embodiment.

Referring to FIG. 7, the decision circuit (213), including an integrator (701), a comparator (703), and a threshold function (711) inter coupled as depicted, is coupled to the signal at the input (223) and the reference time provided at the output (219) and operates to provide decisions or symbols for each symbol time at the output (117). More specifically, the DC free and amplitude compensated signal at the input (223) is summed or integrated over the preceding two symbol times by the integrator (701) to provide a summed signal at a output (702). The integrator (701) determines where a symbol boundaries is temporally located by use of the reference time at output (219). The summed signal at output (702) of the integrator is then compared, by the comparator (703), against a decision threshold provided by the threshold function (711) at input (713). If the output of the integrator is greater than the decision threshold, a "1" bit is declared and if not, a "0" bit is declared for the data symbol and supplied to the output (117).

The data symbols are fed back to the threshold function (711). Here the data symbols are stored and delayed for two symbol times by elements (707 and 709). Depending upon the state of the two previously generated data symbols, the decision threshold (713) is adjusted. Since there are four possible states in the threshold function, there are four different threshold values than can be passed to the comparator (703). The decision threshold values used in the preferred embodiment are given by:

| 00 | −0.13125 |
| 01 | 0.0625 |
| 10 | −0.0625 |
| 11 | 0.13125 |

The paper 'Multilevel Decision Method for Band-Limited Digital FM with Limiter-Discriminator Detection' by M. Hirono, T. Mild, and K. Mutota, IEEE Transactions on Vehicular Tech., Vol. VT 33, No. 3, August 1984 pages 114–122, provides a detail description on an implementation approach for the decision function.

Figure 8:
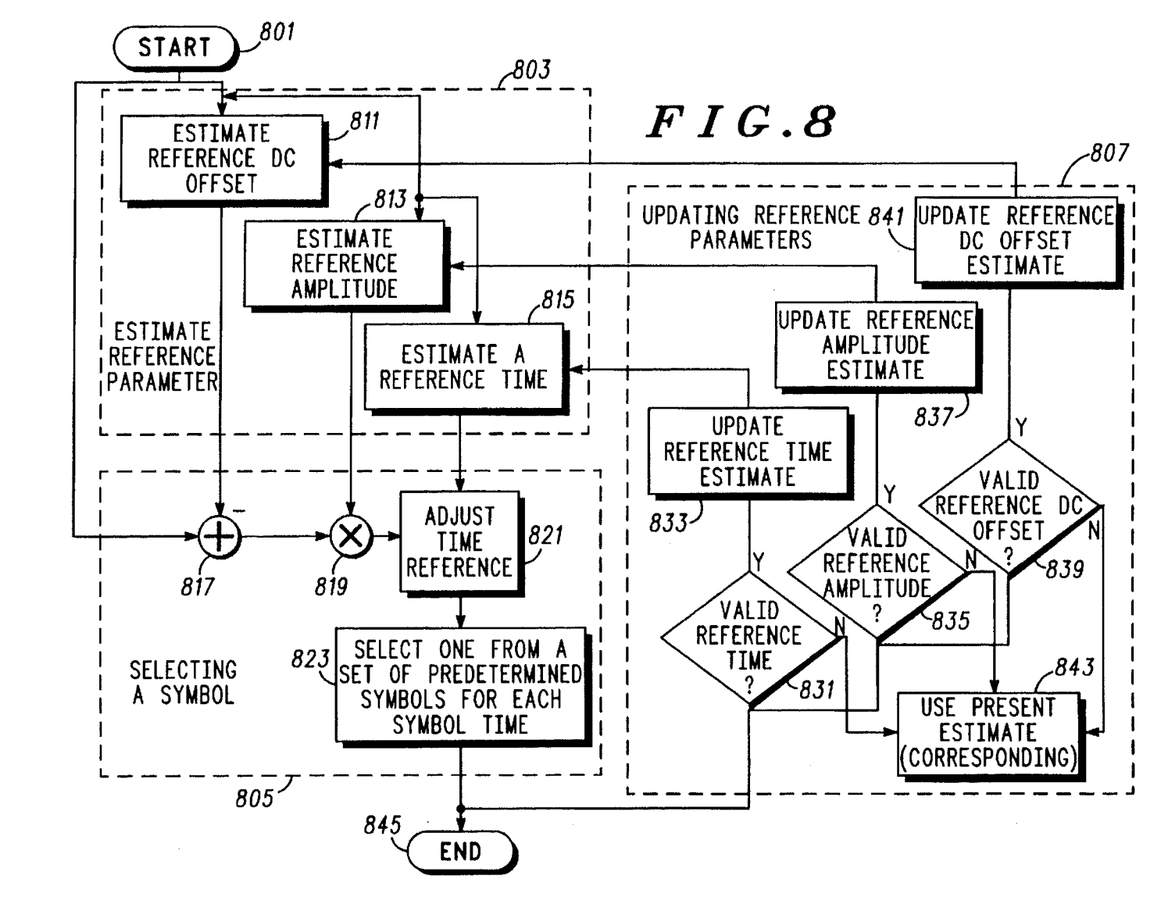
FIG. 8 is a process flow chart exemplifying the operation of an embodiment of the instant invention.

Referring to FIG. 8 a method embodiment of the instant invention will be explained in greater detail. Beginning at step (801) with a data signal a reference parameter of the data signal is estimated at step (803). Responsive to this estimate, together with the data signal the process, at step (805), selects a symbol for a symbol time from a set of predetermined symbols, then updates the reference parameter at step (807) when and if the symbol is representative of or reflects a valid set of conditions for the reference parameter, and ends at step (845).

Referring to step (803) in more detail, for the current data symbol, an reference DC offset is estimated at step (811), a reference amplitude is estimated at step (813), and a reference time is estimated at step (815). These estimated parameters are used to select a symbol by the step (805).

At step (805), the reference DC offset from step (811) is subtracted from the data signal or symbol at step (817). The result is then scaled or weighted (multiplied) by the reference amplitude from step (813) at step (819). The result is then adjusted to the reference time from step (815) at step (821). This now forms a completely compensated signal symbol which is used to select a symbol from a set of predetermined symbols at step (823). The resulting symbol from step (823) is fedback to update the reference parameter process at step (807).

Referring to step (807) in more detail. The data symbols being fed back are examined for or tested against the patterns 1100, 0011, 1010, and 0101 at step (831). If one of these patterns is detected the reference time is updated as indicated at step (833) and this result is communicated back to step (815). If the correct patterns are not located, the present reference time estimate continues to be used at step (843). Similarly the data symbols being fed back are tested or examined for the patterns 000 and 111. If these are located at process step (835), then the reference amplitude is updated at step (837) and this result is communicated back to step (813). If the correct patterns are not located, the present reference amplitude estimate continues to be used at step (843). The data symbols being fed back are further tested or examined for the patterns 000 and 111. If these are located by process step (839), then the reference DC offset is updated at step (841) and this result is communicated back to step (811). If the correct patterns are not located, the present reference DC offset estimate continues to be used at step (843). The process depicted by FIG. 8 is repeated for each symbol in the data signal It will be appreciated by those of ordinary skill in the art that the apparatus and method disclosed provide data demodulation that may be advantageously deployed in a wireless data communications system to demodulate a data signal that demonstrates a partial response. Experimental results under some circumstances have shown as much as an 8 decibel improvement over conventional approaches. Thus, the present invention satisfies a long-felt need of wireless data communications by providing an exemplary data receiver and data decoder that employ methods and procedures to account for modulation approaches that have partial responses.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A data demodulator comprising:
   a selectively updated estimator for estimating at least one reference parameter based at least in part on an input data signal;
   a detector coupled to the estimator and responsive to the at least one reference parameter and the data signal for selecting a sequence of symbols, each selected from a set of predetermined symbols; and
   a pattern selective feedback coupling a detector output and the estimator, the pattern selective feedback detecting a symbol pattern from the sequence of symbols and updating the at least one reference parameter when and only when the sequence of symbols is equal to one of a first set of predetermined data patterns.

2. The data demodulator of claim 1 wherein the estimator comprises at least one of an amplitude estimator, a DC offset estimator, and a timing estimator.

3. The data demodulator of claim 2 wherein the estimator comprises the DC offset estimator adapted to output a DC offset reference parameter, the amplitude estimator adapted to output an amplitude reference parameter, and the timing estimator adapted to output a timing reference parameter, wherein the detector is responsive to each of the DC offset, amplitude and timing reference parameters when selecting the first symbol.

4. The data demodulator of claim 3 wherein the detector comprises an offset adjustor responsive to the DC offset reference parameter and the data signal to provide a DC offset data signal, and a weighting unit responsive to the amplitude reference parameter and the DC offset data signal to provide a weighted data signal.

5. A data demodulator comprising:
   a selectively updated estimator comprising a DC offset estimator and an amplitude estimator for estimating at least a DC offset reference parameter and an amplitude reference parameter based at least in part on an input data signal;
   a detector coupled to the estimator and responsive to the DC offset reference parameter, the amplitude reference parameter and the input data signal for selecting a first symbol for a first symbol time from a set of predetermined symbols; and
   a pattern selective feedback coupling a detector output and the estimator, the pattern selective feedback comprising a first symbol pattern detector to detect a symbol pattern to which the first symbol is associated, and an update unit responsive to the symbol pattern detector for controlling at least one of the DC offset estimator and amplitude estimator, respectively, to determine and output an updated DC offset reference parameter and an updated amplitude reference parameter, respectively, when the symbol pattern is one of a first set of predetermined data patterns.

6. The data demodulator of claim 5 wherein the pattern selective feedback further comprises a further update unit to receive the symbol pattern and control a timing estimator to determine and output an updated timing reference parameter when the symbol pattern is one of a second set of predetermined data patterns different from the first set.

7. The data demodulator of claim 6 wherein the detector is a GMSK detector, and wherein the first set of predetermined data patterns comprises symbol patterns 000 and 111, and the second set comprises symbol patterns 0000, 0101, 1010 and 1111.

8. A data receiver comprising:
   a receiver,
   a selectively updated estimator, in communication with the receiver to receive a data signal, for estimating at least one reference parameter based at least in part on the data signal;
   a detector coupled to the estimator and responsive to the at least one reference parameter and the data signal for selecting a sequence of symbols, each selected from a set of predetermined symbols; and
   a pattern selective feedback coupling a detector output and the estimator, the pattern selective feedback detecting symbol patterns from the sequence of symbols and updating the at least one reference parameter when and only when the sequence of symbols is associated with one of a first set of predetermined data patterns.

9. The data receiver of claim 8 wherein the estimator comprises at least one of an amplitude estimator, a DC offset estimator, and a timing estimator.

10. The data receiver of claim 9 wherein the estimator comprises the DC offset estimator adapted to output a DC offset reference parameter, the amplitude estimator adapted to output an amplitude reference parameter, and the timing estimator adapted to output a timing reference parameter, wherein the detector is responsive to each of the DC offset, amplitude and timing reference parameters when selecting the first symbol.

11. The data receiver of claim 10 wherein the detector comprises an offset adjustor responsive to the DC offset reference parameter and the data signal to provide a DC offset data signal, and a weighting unit responsive to the amplitude reference parameter and the DC offset data signal to provide a weighted data signal.

12. A data receiver comprising:
a receiver,
a selectively updated estimator comprising a DC offset estimator and an amplitude estimator for estimating at least a DC offset reference parameter and an amplitude reference parameter based at least in part on an input data signal;
a detector coupled to the estimator and responsive to the DC offset reference parameter, the amplitude reference parameter and the data signal for selecting a first symbol for a first symbol time from a set of predetermined symbols; and
a pattern selective feedback coupling a detector output and the estimator, wherein the pattern selective feedback comprises a first symbol pattern detector to detect a symbol pattern to which the first symbol is associated, and an update unit responsive to the symbol pattern detector for controlling at least one of the DC offset estimator and amplitude estimator, respectively, to determine and output an updated DC offset reference parameter and an updated amplitude reference parameter, respectively, when the symbol pattern is one of a first set of predetermined data patterns.

13. The data receiver of claim 8 wherein the pattern selective feedback further comprises a further update unit to receive the symbol pattern and control a timing estimator to determine and output an updated timing reference parameter when the symbol pattern is one of a second set of predetermined data patterns different from the first set.

14. The data receiver of claim 13 wherein the detector is a GMSK detector, and wherein the first set of predetermined data patterns comprises symbol patterns 000 and 111, and the second set comprises symbol patterns 0000, 0101, 1010 and 1111.

15. In a data demodulator, a method comprising:
providing at least one reference parameter based at least in part on a received data signal;
selecting, responsive to the reference parameter and the data signal, a sequence of symbols, each selected from a set of predetermined symbols;
detecting a symbol pattern from the sequence of symbols;
selectively updating the at least one reference parameter to provide an updated reference parameter when the sequence of symbols is associated with one of a first set of predetermined data patterns; and
continuing to use the at least one reference parameter when the first symbol is associated with a data pattern not part of the first set of predetermined data patterns.

16. The method of claim 15 wherein the providing step comprises providing at least one of an amplitude reference parameter, a DC offset reference parameter, and a timing reference parameter.

17. The method of claim 15 wherein the providing step comprises providing an amplitude reference parameter, a DC offset reference parameter, and a timing reference parameter, and the step of selecting comprises determining the first symbol based on the data signal and each of the DC offset, amplitude and timing reference parameters.

18. The method of claim 17 wherein the step of selecting further comprises offset adjusting the data signal responsive to the DC offset reference parameter to provide a DC offset data signal, and weighting, responsive to the amplitude reference parameter, the DC offset data signal to provide a weighted data signal.

19. In a data demodulator, a method comprising:
providing at least one reference parameter based at least in part on a received data signal;
selecting, responsive to the reference parameter and the data signal, a sequence of symbols, each selected from a set of predetermined symbols;
detecting a symbol pattern from the sequence of symbols;
selectively updating the at least one reference parameter to provide an updated reference parameter when the sequence of symbols is associated with one of a first set of predetermined data patterns; and
continuing to use the at least one reference parameter when the first symbol is associated with a data pattern not part of the first set of predetermined data patterns, wherein the step of selectively updating further comprises detecting a symbol pattern to which the first symbol is associated, and updating responsive to the detected symbol pattern at least one of a DC offset reference parameter and an amplitude reference parameter, respectively, to provide an updated DC offset reference parameter and an updated amplitude reference parameter, respectively, when the symbol pattern is one of the first set of predetermined data patterns.

20. The method of claim 19 wherein the step of selectively updating further comprises updating a timing reference parameter when the symbol pattern is one of a third set of symbols different from the first set.

21. The method of claim 20 wherein the data signal is a GMSK modulated signal, the first set of predetermined data patterns comprises symbol patterns 000 and 111, and the third set comprises symbol patterns 0000, 0101, 1010 and 1111.

22. In a data demodulator, a method comprising:
providing at least one reference parameter based at least in part on a received data signal;
selecting, responsive to the reference parameter and the data signal, a sequence of symbols, each selected from a set of predetermined symbols;
detecting at a sequence of decision positions a symbol pattern from the sequence of symbols;
selectively updating, at a sequence of center positions intermediate between decision positions, the at least one reference parameter to provide an updated reference parameter when the sequence of symbols is associated with one of a first set of predetermined data patterns; and
continuing to use the at least one reference parameter when the first symbol is associated with a data pattern not part of the first set of predetermined data patterns.

* * * * *